United States Patent [19]

Schafler

[11] Patent Number: 5,344,097
[45] Date of Patent: Sep. 6, 1994

[54] RECORDING AND REPRODUCING APPARATUS FOR A RECORD CARRIER IN TAPE FORM

[75] Inventor: Winfried Schafler, Korneuburg, Austria

[73] Assignee: U.S. Philips Corporation, New York, N.Y.

[21] Appl. No.: 883,811

[22] Filed: May 13, 1992

Related U.S. Application Data

[63] Continuation of Ser. No. 566,742, Aug. 13, 1990, abandoned.

[30] Foreign Application Priority Data

Aug. 25, 1989 [AT] Austria ............................. 2015/89

[51] Int. Cl.⁵ ......................................... G11B 15/26
[52] U.S. Cl. ................................. 242/356.7; 242/340
[58] Field of Search ............... 242/201, 204, 206, 208, 242/209; 360/96.3, 96.4

[56] References Cited

U.S. PATENT DOCUMENTS

| | | | |
|---|---|---|---|
| 3,472,464 | 10/1969 | Morimoto et al. | 242/208 |
| 3,813,690 | 5/1974 | Oka | 242/201 X |
| 4,010,918 | 3/1977 | Kato | 242/204 X |
| 4,026,496 | 5/1977 | Kaneda | 242/201 X |
| 4,133,498 | 1/1979 | Laufer | 242/201 |
| 4,185,794 | 1/1980 | Mukaida | 242/208 X |
| 4,196,874 | 4/1980 | Ohara | 242/201 |
| 4,330,098 | 5/1982 | Santoro | 242/201 |
| 4,337,910 | 7/1982 | Santoro | 242/204 |
| 4,581,666 | 4/1986 | Ito | 360/96.4 |

FOREIGN PATENT DOCUMENTS

3108296 9/1982 Fed. Rep. of Germany.

*Primary Examiner*—Daniel P. Stodola
*Assistant Examiner*—John P. Darling
*Attorney, Agent, or Firm*—Brian J. Wieghaus

[57] ABSTRACT

A recording and/or reproducing apparatus (1) for a record carrier (5) in tape form which extends between two adjacent hubs (3, 4). The apparatus has two winding spindles (9, 10) for driving the two hubs (3, 4), each of the winding spindles being connected in a rotationally fixed manner to a respective friction wheel (14, 15). A rotatable driving part (18) is rotatably mounted on a swivellable carrier (24) arranged centrally in relation to the two friction wheels (14, 15). The carrier (24) can be swivelled about two swivel bearings (41, 42) situated at a distance from one another, each of which is allocated to one friction wheel (14, 15). When the driving part (18) is in drive connection with one of the two friction wheels (14, 15), a plane (46) through the axis (43) of the driving part (18) and the axis (44, 45) of the swivel bearing (41, 42), allocated to the friction wheel (14, 15) concerned, of the carrier (24) extends essentially perpendicular to a plane (47) through the axis (43) of the driving part (18) and the axis (26, 27) of the friction wheel (14, 15) concerned.

6 Claims, 2 Drawing Sheets

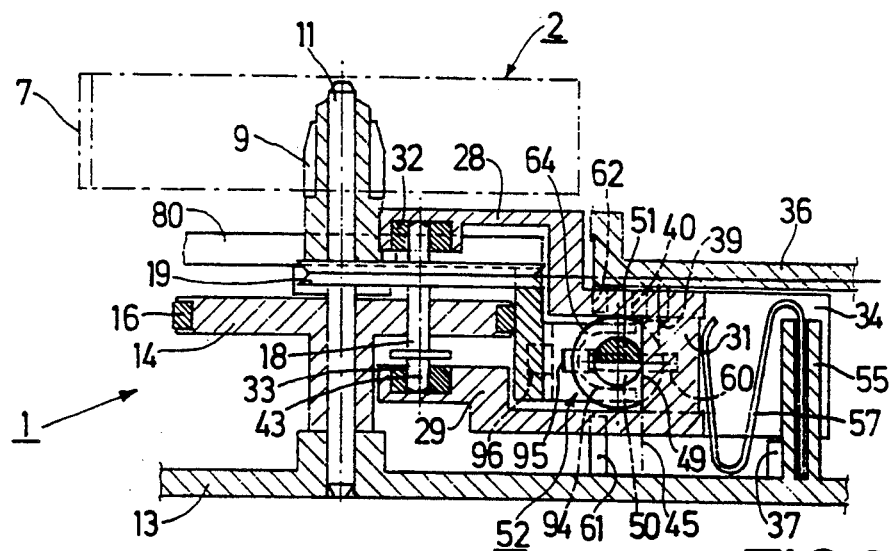
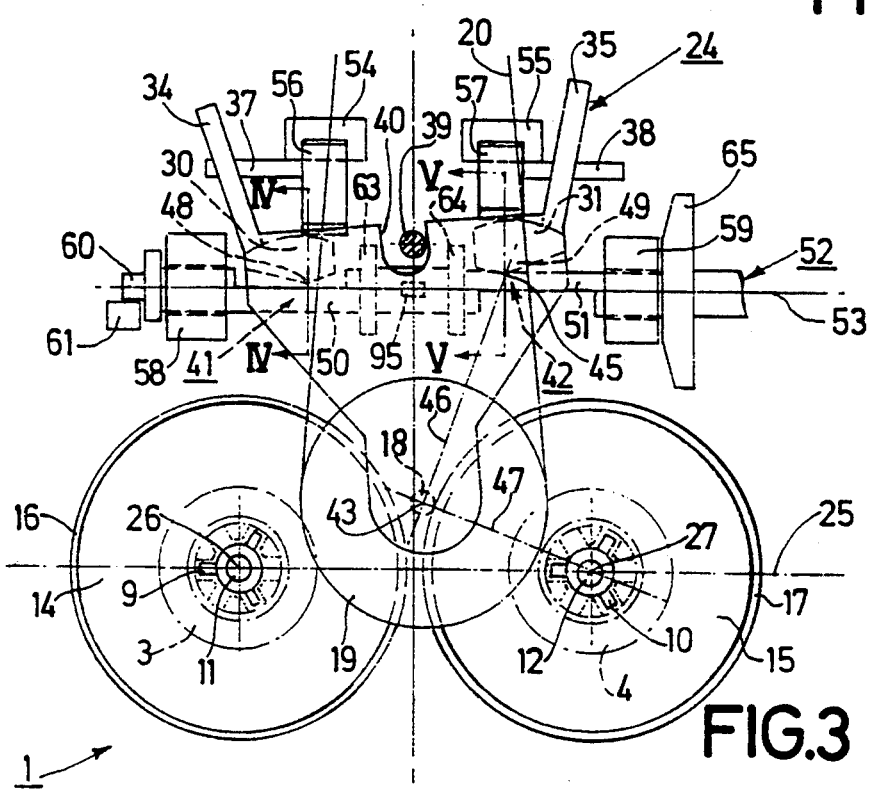
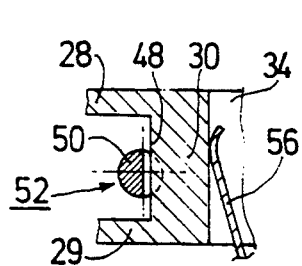
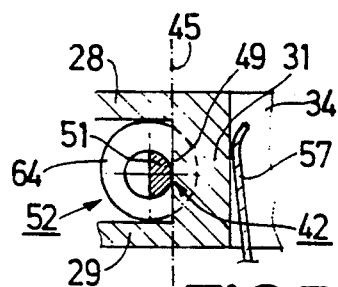

RECORDING AND REPRODUCING APPARATUS FOR A RECORD CARRIER IN TAPE FORM

This is a continuation of application Ser. No. 07/566,742 filed Aug. 13, 1990, now abandoned.

BACKGROUND OF THE INVENTION

The invention relates to a recording and/or reproducing apparatus for a record carrier in tape form which extends between two adjacent, rotatingly driveable hubs, having two rotatingly driveable winding spindles, provided for driving the hubs, and having two adjacent friction wheels, each of which is in drive connection with one of the two winding spindles and are alternatively driveable at the periphery by a rotatingly driveable, driving part which is rotatably mounted on a swivellable carrier arranged centrally in relation to the two friction wheels and can be brought alternatively into friction drive connection with one of the two friction wheels at the periphery by swivelling the carrier and, with the friction drive connection established, rests against the friction wheel concerned under spring force. Such an apparatus is known, for example, from German Offenlegungsschrift 2,348,941.

In the known apparatus, the carrier for the driving part formed by a friction wheel is swivellable about a single swivel bearing and, when the driving part is in friction drive connection with one of the two friction wheels in drive connection with the winding spindles, a plane through the axis of the driving part and the axis of the swivel bearing of the carrier and a plane through the axis of the driving part and the axis of the friction wheel concerned enclose an obtuse angle, i.e. an angle of more than 90°. In this known apparatus, the force transmission conditions between the driving part and the friction wheels are firstly dependent on the spring force with which the driving part rests against the friction wheel concerned and, secondly, also on pull-in effects which act on the driving part due to the obtuse angle mentioned above and endeavour to increase this angle. These pull-in effects are dependent on the coefficient of friction between the friction partners, which, however, alters when considered over the service life, namely decreases to a relatively marked extent. As a result, the force transmission conditions overall change when considered over the service life, in particular the transmission of force from the driving part to the two friction wheels decreases to a relatively marked extent with time. Thus the force transmission conditions are not uniformly good when considered over the service life, this being unfavourable with regard to uniformly good driving of the two friction wheels and hence of the record carrier. These pull-in effects are also additionally dependent on load fluctuations on the friction wheel driven in the particular case which are due to the hub driven by the friction wheel, this leading to nonuniform driving of the friction wheel concerned and hence of the record carrier depending on the changing pull-in effects.

SUMMARY OF THE INVENTION

The object of the invention is to overcome the difficulties presented above are avoided and to achieve uniformly good force transmission conditions between the driving part and the two friction wheels and uniform driving of the friction wheels.

For this purpose, the invention is characterized in that the carrier can be swivelled about two displaceable swivel bearings situated at a distance from one another, of which each swivel bearing is allocated to one of the two friction wheels, and in that when the driving part is in friction drive connection with one of the two friction wheels, a plane through the axis of the driving part and the axis of the respective carrier swivel bearing of the friction wheel concerned extends essentially perpendicular to a plane through the axis of the driving part and the axis of the friction wheel concerned. In this way it is achieved that the driving part engages on each of the two friction wheels at a right angle and thus no pull-in effects dependent on the coefficient of friction between the friction partners, which alters when considered over the service life, and on load fluctuations on the friction wheels, act on the driving part. In this way, the force transmission conditions between the driving part and the two friction wheels are essentially determined only by the spring force with which the driving part rests against the friction wheel concerned. Since, however, this spring force remains of virtually unchanged magnitude when considered over the service life, at all times uniformly good force transmission conditions are thus guaranteed, with the result that an at all times uniform transmission of force to the two friction wheels and hence at all times satisfactory driving of the record carrier is achieved.

The adjustable swivel bearings of the carrier and the adjustment of these swivel bearings and hence of the carrier can be designed in various ways. Each swivel bearing can, for example, have a bearing pin which protrudes into a bearing bore on the carrier, for the purpose of the adjustment of the swivel bearing concerned the bearing pin being attached to a slidably and swivellably mounted adjustment slide which can be adjusted via an adjustment spring by an actuating member. However, it has proven particularly advantageous if the two adjustable swivel bearings of the carrier are each formed by a shoulder of essentially V-shaped cross-section of the carrier and a shaft portion of cam-shaped cross-section, allocated to the latter, of a control shaft which controls the adjustment of the swivel bearings and hence of the carrier and is rotatably mounted in the apparatus in such a way as to extend parallel to a plane through the axes of the two friction wheels and perpendicular to these axes, the shoulders of the carrier are loaded towards the cam-shaped shaft portions of the control shaft which are allocated to them by at least one spring engaging on the carrier and the control shaft can be rotated out of an initial position, in which both shoulders of the carrier rest against the cam-shaped shaft portions allocated to them and the driving part is lifted off from the two friction wheels, into two operating positions in which one shoulder of the carrier in each case is lifted off from the cam-shaped shaft portion allocated to it and the other shoulder of the carrier rests against the shaft portion allocated to it and the driving part rests against the friction wheel which is allocated to the swivel bearing whose shoulder is resting against the shaft portion allocated to it. In this way, a design is achieved which is particularly simple and tolerance-insensitive both as regards the construction of the adjustable swivel bearings of the carrier and the adjustment of these swivel bearings and hence of the carrier.

In this connection it has proven particularly advantageous if the carrier is of essentially U-shaped design and has two leg portions extending perpendicularly to the plane through the axes of the two friction wheels and at least one web portion connecting the two leg portions to one another and extending in the direction of the axes of the two friction wheels, the control shaft is arranged between the two leg portions of the carrier and adjacent to the web portion of the carrier and the two essentially V-shaped shoulders of the carrier are provided on the web portion of the carrier. A particularly compact and operationally reliable design is in this way achieved, which is additionally advantageous as regards good bearing of the driving part because the driving part can be rotatably mounted at two points in the two leg portions of the carrier part.

In such an apparatus according to the invention, having a carrier of U-shaped design, it has proven particularly advantageous if the control shaft additionally has at least one circular disc-shaped shaft portion of larger diameter than the control shaft, against which the carrier rests in the direction of the axes of the two friction wheels with at least one of its two leg portions for the purpose of its positioning. In this way, the control shaft with its circular disc-shaped shaft portion, of which there is at least one, is additionally utilized for positioning purposes for positioning the carrier.

It has furthermore proven advantageous if a displaceable locking device for locking the control shaft in its initial position is provided, with which, in the initial position of the control shaft, the latter can be locked against rotation. The control shaft can thereby be locked in its initial position in a simple manner, as a result of which it is possible for the driving part to be held reliably out of drive connection to the two friction wheels.

It has proven particularly advantageous here if the locking device is formed by a displaceable braking part for the two friction wheels, which braking part has two braking surfaces for braking the two friction wheels, with which the control shaft can be locked against rotation when the braking surfaces have been lifted off from the friction wheels and which releases the control shaft for rotation when the braking surfaces have been placed against the friction wheels. In this way it is achieved that the control shaft is only released for displacement into one of its two operating positions if the braking surfaces are first of all placed against the friction wheels and the friction wheels are therefore braked at the moment when the driving part is placed against one of the latter. The driving part can thus be brought into drive connection with one of the friction wheels only in the case where the friction wheels have first been braked, this being advantageous as regards as low as possible a loading of these components and of the record carrier driven via the friction wheels and the winding spindles. After the friction wheels have first of all been braked and the driving part has been brought into drive connection with one of the latter, the braking surfaces are then lifted off from the friction wheels again by appropriate displacement of the braking part, after which one of the two friction wheels can be driven by the driving part.

The invention is described in greater detail below with reference to an illustrative embodiment represented in the drawings, although there is no intention to restrict the invention to said illustrative embodiment.

BRIEF DESCRIPTION OF THE DRAWING

FIG. 2 shows part of the apparatus according to FIG. 1 in a section along the line II—II in FIG. 1.

FIG. 3 shows a plan view of a part of the apparatus according to FIG. 1, the carrier occupying an operating position in which the drive shaft rotatably mounted on the carrier rests against one of the two friction wheels;

FIG. 4 shows a detail of the apparatus according to FIG. 1, in a section along the line IV—IV in FIG. 3;

FIG. 5 shows a further detail of the apparatus according to FIG. 1, in a section along the line V—V in FIG. 3.

DESCRIPTION OF THE PREFERRED EMBODIMENTS

Figure 1:
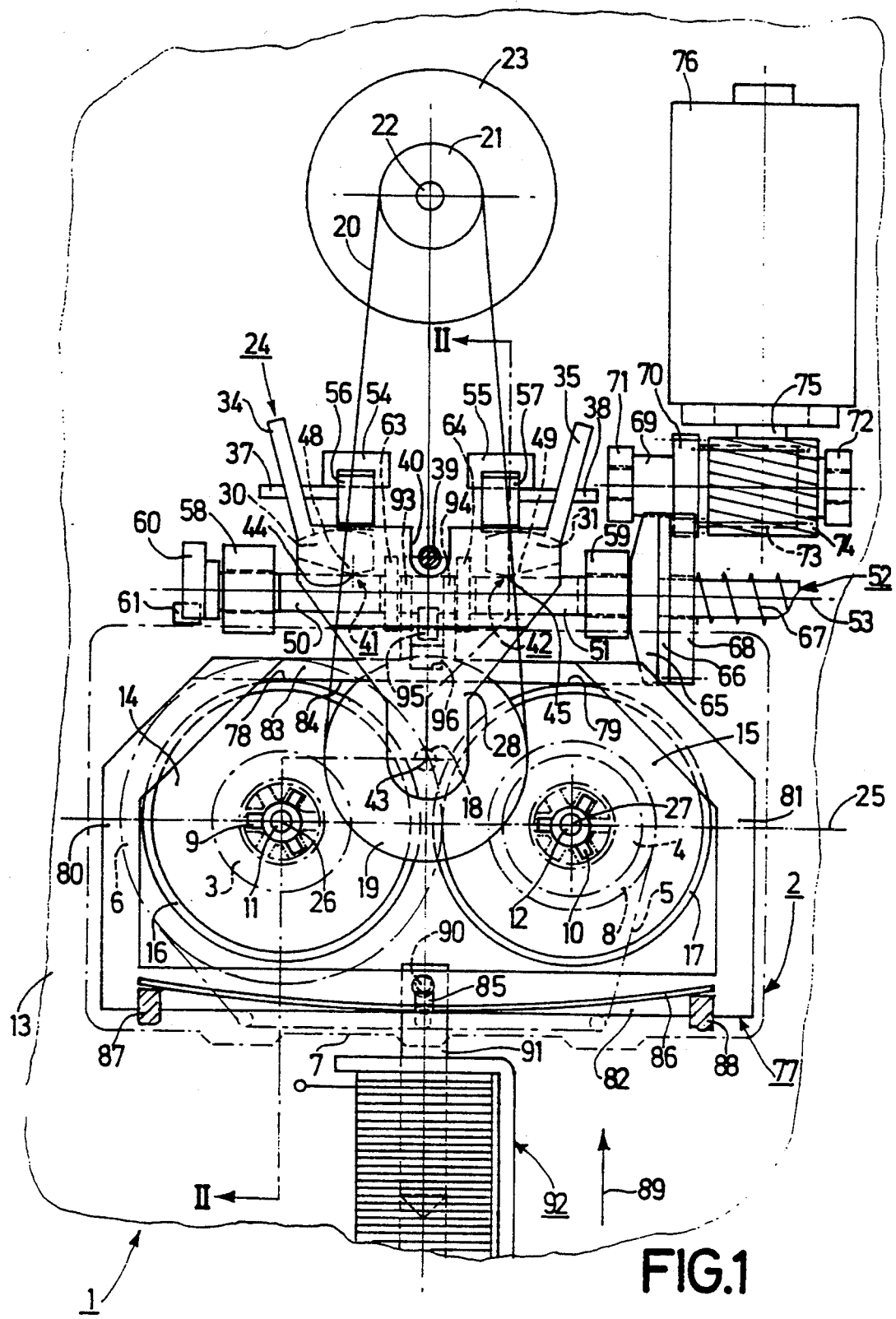
FIG. 1 shows schematically in plan view a part of a a magnetic tape apparatus, into which a cassette having two adjacent hubs can be inserted and, for driving the hubs, has two winding spindles, each of which is connected to a friction wheel driveable nonpositively at the periphery by means of a drive shaft, the drive shaft being rotatably mounted on a carrier which can be swivelled about two adjustable swivel bearings situated at a distance from one another and, according to FIG. 1, is occupying a neutral central position.

Illustrated schematically in FIGS. 1 and 2 is a part of a magnetic tape apparatus 1, into which a cassette 2, indicated by broken lines, can be inserted, for which purpose the apparatus has a trough-shaped cassette tray (not shown). The cassette 2 contains two adjacent, rotatingly driveable hubs 3 and 4, which are rotatably mounted between the principal walls of the cassette and between which there extends a magnetic tape 5. The magnetic tape 5 is here guided from a tape reel 6 wound onto hub 3, along a long narrow cassette side 7, to a tape reel 8 wound onto hub 4. Provided in the long narrow cassette side 7 are two openings, through which magnetic heads (not shown) for recording and reproducing and for erasing information signals, for example speech signals, on or from the magnetic tape are in scanning connection with the magnetic tape. For the scanning of the magnetic tape, the tape is driveable, in an operating mode "normal forward running" and in an operating mode "normal rewind", which is also called "reverse running", in opposite directions of tape past the magnetic heads. The magnetic tape is driven either by driving hub 4 at constant rotational speed or by driving hub 3 at constant rotational speed. When the magnetic tape is driven via hub 4 in the operating mode "normal forward running", recording, reproduction and erasure of information signals is effected in a first track of the magnetic tape and, when the magnetic tape is driven via hub 3 in the operating mode "reverse running", the recording, reproduction and erasure of information signals is effected in a second track of the magnetic tape.

For the purpose of driving the hubs 3 and 4, the apparatus 1 has two winding spindles 9 and 10, each of which is connected in a manner fixed in terms of rotation to a shaft 11 or 12 respectively, the shafts 11 and 12 being rotatably mounted in an essentially plate-shaped main chassis 13. A friction wheel 14 or 15 is connected in a manner fixed in terms of rotation to each shaft 11 and 12 respectively. Each friction wheel 14 and 15 respectively is provided on the periphery with a rubber covering 16 and 17 respectively, which is inserted into a peripheral groove of each friction wheel and is provided for the purpose of obtaining a good frictional effect. For the purpose of driving the two friction wheels 14 and 15 at the periphery, the apparatus 1 has a drive shaft 18 rotatingly driveable by a motor. The drive shaft 18 is connected in a manner fixed in terms of rotation to a pulley 19. The pulley 19 is in drive connection with another pulley 21 via an endless belt 20. The other pulley 21 is seated in a manner fixed in terms of rotation on a motor shaft 22 of a motor 23, which is secured on the main chassis 13 and is alternatively rotatingly driveable at constant rotational speed in opposite directions of rotation. Via the drive connection described, the drive shaft 18 can alternatively be driven at constant rotational speed by the motor 23 in opposite directions of rotation.

The drive shaft 18 is rotatably mounted on a swivellable carrier 24 arranged centrally with respect to the two friction wheels 14 and 15. The carrier 24 can alternatively be swivelled in opposite swivelling directions out of a neutral central position represented in FIG. 1 into two operating positions, one of which is represented in FIG. 3. By swivelling the carrier 24 out of its central position into one of its two operating positions, the drive shaft 18 rotatably mounted on the carrier 24 can alternatively be brought peripherally into nonpositive drive connection with one of the two friction wheels 14 and 15, as can be seen from FIG. 3, the drive shaft 18 being in friction drive connection with friction wheel 15. When the friction drive connection has been established, the drive shaft 18 rests against the friction wheel 14 or 15 concerned under spring force, this being explained in greater detail below.

The carrier 24 is essentially of U-shaped design. The carrier 24 has two leg portions 28 and 29 of offset design extending perpendicularly to a plane 25, indicated by a chain line, through the axes 26 and 27 of the two friction wheels 14 and 15, and two web portions 30 and 31 connecting the two leg portions 28 and 29 to one another and extending in the direction of the axes 26 and 27 of the two friction wheels 14 and 15. Provided in each of the two leg portions 28 and 29 in the region of their free ends is a bearing 32 and 33, in which the drive shaft 18 is rotatably mounted. The drive shaft 18 is thereby advantageously mounted at two points. In its region facing away from the drive shaft 18, the carrier 24 has two extensions 34 and 35, with which the carrier 24 is positioned, as regards its vertical position, i.e. in its position in the direction of the axes 26 and 27 of the two friction wheels 14 and 15, between a further plate-shaped additional chassis 36 (only shown in FIG. 2) and two positioning extensions 37 and 38 projecting vertically from the main chassis 13. For the lateral positioning of the carrier 24, a positioning pin 39 projecting from the additional chassis 36 in a direction towards the main chassis 13 protrudes with play into a U-shaped positioning recess 40 which is provided in leg portion 28 of the carrier 24. In FIGS. 1 and 3, the play between the positioning pin 39 and the positioning recess 40 is represented on an enlarged scale for the purpose of clarity.

The carrier 24 can now be swivelled about two adjustable swivel bearings 41 and 42 situated at a distance from one another, of which each swivel bearing 41 or 42 is allocated to one of the two friction wheels 14 and 15. Swivel bearing 41 is allocated to friction wheel 14 and swivel bearing 42 is allocated to friction wheel 15. The arrangement of the two swivel bearings 41 and 42 in the apparatus 1 is chosen in such a way that, when the drive shaft 18 is in friction drive connection with one of the two friction wheels 14 and 15, a plane through the axis 43 of the drive shaft 18 and the axis 44 or 45 of the swivel bearing 41 or 42 allocated to the friction wheel 14 or 15 concerned, of the carrier 24 extends essentially perpendicular to a plane through the axis 43 of the drive shaft 18 and the axis 26 or 27 of the friction wheel 14 or 15 concerned. In FIG. 3, this situation is represented for one operating position of the carrier 24, in which the drive shaft 18 is in friction drive connection with the friction wheel 15. Here, the plane through the axis 43 of the drive shaft 18 and the axis 45 of the swivel bearing 42 allocated to friction wheel 15 is designated by the reference numeral 46 and the plane through the axis 43 of the drive shaft 18 and the axis 27 of friction wheel 15 is designated by the reference numeral 47. The two planes 46 and 47 enclose a right angle. Similar conditions are present when the drive shaft 18 is in first drive connection with friction wheel 14. In this case, a plane through the axis 43 of the drive shaft 18 and the axis 44 of the swivel bearing 41 allocated to friction wheel 14 and a plane through the axis 43 of the drive shaft 18 and the axis 26 of friction wheel 14 enclose a right angle. It is hereby advantageously achieved that the drive shaft 18 engages on each of the two friction wheels 14 and 15 respectively at a right angle, with the result that no pull-in or push-away effects dependent on the coefficient of friction between the friction partners and on load fluctuations on the friction wheels act on the drive shaft 18. Force transmission conditions between the drive shaft 18 and the friction wheels 14 and 15 which are always uniformly good as seen over the service life are thereby guaranteed, with the result that an at all times uniform transmission of force to the two friction wheels 14 and 15 and thus an at all times satisfactory driving of the magnetic tape 5 in each of its two tape running directions is achieved over the entire service life.

The two adjustable swivel bearings 41 and 42 of the carrier 24 are each formed in a particularly simple manner by a shoulder 48 and 49 respectively, of essentially V-shaped cross-section, of the carrier 24, which two shoulders 48 and 49 are provided on the web portions 30 and 31 of the carrier 24, and by a shaft portion 50 and 51 respectively, associated with the latter and of cam-shaped cross-section, of a control shaft 52 controlling the adjustment of the swivel bearing 41 and 42 and thus of the carrier 24. The cam-shaped shaft portions 50 and 51 are designed to be of semicircular cross-section. In the situation represented in FIGS. 1 and 2, semicircular shaft portion 50 of the control shaft 52 is situated essentially above the axis 53 of the control shaft 52 and semicircular shaft portion 51 of the control shaft 52 is situated essentially below the axis 53 of the control shaft 52. A doubly bent leaf spring 56 or 57 introduced by one end into a spring chamber 54 and 55 on the main chassis 13 engages on the two web portions 30 and 31 in each case. By means of these leaf springs 56 and 57, the V-shaped shoulders 48 and 49 of the carrier 24 are loaded towards the semicircular shaft portions 50 and 51 of the control shaft 52 which are allocated to them.

The control shaft 52 is rotatably mounted with the aid of two bearings 58 and 59 and it extends parallel to the plane 25 through the axes 26 and 27 of the two friction wheels 14 and 15 and perpendicular to these two axes 26 and 27. The control shaft 52 can be rotated in opposite directions of rotation, in each case by 90°, out of an initial position represented in FIGS. 1 and 2, in which both V-shaped shoulders 48 and 49 of the carrier 24 rest against the cam-shaped shaft portions 50 and 51 which are allocated to them and the drive shaft 18 is lifted off from the friction wheels 14 and 15, into two operating positions, in which in each case one V-shaped shoulder 48 or 49 of the carrier 24 is lifted off from the cam-shaped shaft portion 50 or 51, allocated to it, of the control shaft 52, unmaking the swivel bearing 41 or 42 concerned, and the other V-shaped shoulder 49 or 48 of the carrier 24 rests against the cam-shaped shaft portion 51 or 50, allocated to it, of the control shaft 52, maintaining the swivel bearing 42 or 41 concerned, and the drive shaft 18 rests against friction wheel 15 or 14 allocated to swivel bearing 42 or 41 respectively, the V-shaped shoulder 49 or 48 of which is resting against the shaft portion 51 or 50 allocated to it. In FIG. 3, the control shaft 52 is represented in the operating position in which it is brought by rotation in the clockwise direction out of its initial position according to FIG. 2. In this operating position, V-shaped shoulder 48 is lifted off from the cam-shaped shaft portion 50 allocated to it, unmaking the swivel bearing 41, as can be seen from FIGS. 3 and 4, and V-shaped shoulder 49 rests against the cam-shaped shaft portion 51 allocated to it, maintaining swivel bearing 42, as can be seen from FIGS. 3 and 5. By virtue of the fact that, due to its cam-shaped, semicircular design, shaft portion 50 is turned away from V-shaped shoulder 48, the carrier 24 is swivelled under the action of the leaf spring 56 until the drive shaft 18 is pressed against friction wheel 15. The contact pressure with which the drive shaft 18 is pressed against friction wheel 15 is here determined by the force of the leaf spring 56, which remains of virtually equal magnitude at all times over the entire service life. An at all times uniformly good transmission of force from the drive shaft 18 to friction wheel 15, said transmission of force being determined by the force of the leaf spring 56, is in this way achieved for the entire service life. The same applies to the transmission of force from the drive shaft 18 to friction wheel 14.

To determine the two operating positions of the control shaft 52, a positioning extension 60 projecting in a radial direction is connected to said shaft, which positioning extension is supported in each of the two operating positions against one of two fixed stops 61 or 62, of which stop 61 projects from the main chassis 13 and stop 62 projects from the additional chassis 36. For the releasable locking of the control shaft 52 in its initial position, the apparatus has an displaceable locking device, which is described below.

The control shaft 52 additionally has two shaft portions 63 and 64 having the shape of circular discs and having a diameter greater than the control shaft 52. For its vertical positioning in the direction of the axes 26 and 27 of the two friction wheels 14 and 15, the carrier 24 rests against the two shaft portions 63 and 64 having the shape of circular discs by its two leg portions 28 and 29. In this way, the control shaft 52 with its shaft portions 63 and 64 having the shape of circular discs additionally serves for the vertical positioning of the carrier 24 of U-shaped design.

For the driving of the control shaft 52, said shaft has a further shaft portion 65 having the shape of a circular disc, on which an annular felt washer 66 is secured, for example by adhesive bonding. A gear 68 rotatably mounted on the control shaft 52 is pressed against the felt washer 66 with its one front face by means of a compression spring 67, which is supported against a collar (not shown) of the control shaft 52. Shaft portion 65, the felt washer 66 and the gear 68 form a slip clutch for compensating differences in travel. A pinion 70 provided in a manner fixed in terms of rotation on a further shaft 69 is in engagement with the gear 68. The shaft 69 is rotatably mounted in two bearings 71 and 72. A worm gear 73 is furthermore provided in a manner fixed in terms of rotation on the shaft 69. This worm gear 73 can be driven by a worm 74 which is connected in a manner fixed in terms of rotation to the motor shaft 75 of a control motor 76 driveable in opposite directions of rotation.

As already mentioned, an adjustable locking device 77 is provided for locking the control shaft 52 releasably in its initial position. The locking device 77 is formed by a displaceable braking part for the two friction wheels 14 and 15, said braking part having two braking surfaces 78 and 79 for braking the two friction wheels 14 and 15. The braking part 77 is guided so as to be displaceable perpendicularly to the plane 25 through the axes 26 and 27 of the two friction wheels 14 and 15 in a manner not shown. With the braking surfaces 78 and 79 lifted off from the friction wheels 14 and 15, the control shaft 52 is lockable against rotation by the braking part 77 and, with the braking surfaces 78 and 79 placed against the friction wheels 14 and 15, the braking part 77 releases the control shaft 52 for rotation. The braking part 77 is of frame-shaped design and has two portions 80 and 81 of flat design, which pass through the plane 25 through the axes 26 and 27 of the two friction wheels 14 and 15, and a further portion 82 of flat design, which connects the two portions 80 and 81 at their end facing away from the control shaft 52, and a further portion 83, which connects the two portions 80 and 81 at their end facing the control shaft 52 and is angled at 90° to the two portions 80 and 81. Provided on the angled further portion 83 are the two braking surfaces 78 and 79, which are here formed directly by parts of a boundary surface 84 of the angled portion 83, said boundary surface facing the friction wheels 14 and 15. Projecting centrally from the flat further portion 82 is a hook 85 of L-shaped design, into which is hooked a leaf spring 86 which is supported by its free ends against two stops 87 and 88 projecting from the additional chassis 36 and strives to displace the braking part 77 in the direction of the arrow 89. Also projecting from the flat further portion 82 is a pin 90, which is coupled to the solenoid plunger 91 of a solenoid plunger magnet 92. By excitation of the solenoid plunger magnet 92, its solenoid plunger 91, and the braking part 77 by the latter, is pulled counter to the direction of the arrow 89, in particular until the braking surfaces 78 and 79 provided on the angled portion 83 come to rest against the friction wheels 14 and 15. When the solenoid plunger magnet 92 is de-excited, the braking part 77 is displaced by the leaf spring 86 in the direction of the arrow 89, in particular until two fork-shaped extensions 93 and 94 of the braking part 77, said extensions projecting towards the control shaft 52 from the angled portion 83, are supported against the control shaft 52. For the purpose of locking the control shaft 52 in its initial position, a locking extension 95 projects from the latter in a radial direction, which locking extension protrudes into a locking depression 96 in the braking part 77 when the control shaft 52 is in its initial position and the braking part 77 has at the same time been displaced in the direction of the arrow 89. By virtue of this, the control shaft 52 can be locked securely in its initial position and the carrier 24 can thereby be locked securely in its neutral central position.

The way in which the apparatus described above operates is explained below. In an initial condition, the control shaft 52 occupies its initial position represented in FIGS. 1 and 2 and the braking part 77 has been displaced in the direction of the arrow 89 to such an extent that the fork-shaped extensions 93 and 94 are supported against the control shaft 52. In this arrangement, the locking extension 95 of the control shaft 52 protrudes into the locking depression 96 in the braking part 77, the control shaft 52 thereby advantageously being secured in its initial position, although this is not shown in FIGS. 1 and 2. With the control shaft 52 in its initial position, the two V-shaped shoulders 48 and 49 rest against the associated cam-shaped shaft portions 50 and 51 under the action of the two leaf springs 56 and 57, the carrier 24 thereby advantageously being positioned securely in its neutral central position, in which the drive shaft 18 is lifted off from both friction wheels 14 and 15. In order to be able to rotate the control shaft 52 into one of its two operating positions, the locking device 77 formed by the braking part is first of all displaced. For this purpose, the solenoid plunger magnet 92 is excited, the braking part 77 thereby being displaced counter to the force of the leaf spring 86 in a direction opposite to that of the arrow 89 until the braking surfaces 78 and 79 rest against the two friction wheels 14 and 15 and thereby advantageously brake the latter firmly, the locking extension 95 of the control shaft 52 then being outside the locking depression 96 in the braking part 77, as shown in FIGS. 1 and 2. The no longer locked control shaft 52 can thus be subsequently rotated. In order, for example, to bring the drive shaft 18 into drive connection with friction wheel 15, as required for the operating mode "normal forward running", the control motor 76 is driven in a predetermined direction of rotation for a predetermined period of time, the control motor 76 thereby driving the control shaft 52, via the worm 74 and the worm gear 73 and via the gear 70 and the slip clutch 68, 66 and 65, out of its initial position according to FIG. 2 in the clockwise direction. The control shaft 52 is thereby rotated by 90° in the clockwise direction until the positioning extension 60 of the control shaft 52 rests against the stop 61 projecting from the main chassis 13, the slip clutch 68, 66 and 65 compensating an overtravel of the control motor 76. During this rotation of the control shaft 52, the V-shaped shoulder 49 of the carrier 24 remains in contact with the cam-shaped shaft portion 51 to form the swivel bearing 42 but the other cam-shaped shaft portion 50 releases the other V-shaped shoulder 48, the carrier 24 thereby being swivelled about the swivel bearing 42 according to FIG. 1 in the anticlockwise direction under the action of the leaf spring 56 until the drive shaft 18 rests against friction wheel 15, as shown in FIG. 3. The drive shaft 18 then engages in an advantageous manner on friction wheel 15 at a right angle, as has already been described above. The solenoid plunger magnet 92 is then de-excited again, the braking part 77 as a result being displaced in the direction of the arrow 89 under the action of the leaf spring 86 until the fork-shaped extensions 93 and 94 of the braking part 77 are supported against the control shaft 52, the locking extension 95, now rotated by 90° relative to the initial position, then being outside the locking depression 96 in the braking part 77 however. By virtue of the displacement of the braking part 77 in the direction of the arrow 89, the braking surfaces 78 and 79 are lifted off from the friction wheels 14 and 15, with the result that these are then no longer firmly braked. The motor 23 according to FIG. 1 is then driven in the clockwise direction, the motor 23 thereby driving the drive shaft 18, via the endless belt drive 21, 20 and 19, in the clockwise direction and the drive shaft 18 driving the friction wheel 15 and hence the winding spindle 10 and the hub 4 in the anticlockwise direction.

In order to end the driving of the hub 4 again and to lift the driving shaft 18 from the friction wheel 15 again, the analogous procedure is carried out in reverse. First of all, the motor 23 is switched off. The solenoid plunger magnet 92 is then excited and the braking part 77 is thereby displaced counter to the direction of the arrow 89, the friction wheels 14 and 15, still rotating due to the prior driving of the magnetic tape, being firmly braked. The control motor 76 is then switched on, in particular such that the control shaft 52 is rotated back into its initial position. As soon as the control shaft 52 has reached its initial position, the solenoid plunger magnet 92 is de-excited again, as a result of which the braking part 77 is displaced by the leaf spring 86 in the direction of the arrow 89 and the control shaft 52 is in the process locked in its initial position by means of the locking depression 96 and the locking extension 95.

In order to bring the drive shaft 18 into drive connection with friction wheel 14, the procedure carried out is analogous to that described above except that the control motor 76 is driven in the other direction of rotation, the control shaft 52 thereby being rotated out of its initial position according to FIG. 2 by 90° in the anticlockwise direction until the positioning extension 60 of the control shaft 52 rests against the stop 62 projecting from the additional chassis 36. In this case, the V-shaped shoulder 48 then remains in contact with the cam-shaped shaft portion 50, swivel bearing 41 being maintained, and the other cam-shaped shaft portion 51 lifts off from the other V-shaped shoulder 49, unmaking swivel bearing 42, with the result that the carrier 24 is swivelled in the clockwise direction about swivel bearing 41 according to FIG. 1 under the action of the leaf spring 57 until the drive shaft 18 rests against friction wheel 14, the drive shaft 18 advantageously engaging on friction wheel 14 at a right angle in this case too, as has already been explained above.

I claim:
1. In an apparatus having
  a pair of spaced and rotatably mounted winding spindles,
  a friction wheel connected to each winding spindle,
  a swivellable carrier arranged centrally in relation to said two winding spindles,
  a rotatable driving part mounted on said carrier for driving said friction wheels, said carrier being swivellable to alternately bring said driving part into driving friction contact with a respective friction wheel, the improvement comprising:
  biasing means engageable with said carrier for swivelling said carrier toward each respective friction wheel and for biasing said driving part against the respective friction wheel;
  two spaced swivel bearings each associated with a respective friction wheel, each bearing being adjustable between an initial position and a fixed operating position, said fixed operating positions being selected such that said carrier swivels about and bears on a respective said swivel bearing in its fixed operating position when said biasing means swivels said carrier to engage a respective one of said friction wheels and such that when said driving part is in contact with said respective one of said friction wheels a plane through the axis of said driving part and the axis of the respective swivel bearing about which said carrier swivelled to en- gage said respective one of said friction wheels extends essentially perpendicularly to a plane through the axis of said driving part and the axis of said respective one of said friction wheels; and control means for controlling the movement of said swivel bearings between said initial and fixed operating positions to control the swivelling of said carrier.

2. In an apparatus according to claim 1, wherein said control means comprises a control shaft for controlling the position of said swivel bearings, said control shaft being rotatably mounted and extending parallel to a plane through the axis of rotation of said two friction wheels and perpendicular to said axis of rotation, said swivel bearings are each comprised of a respective shoulder of essentially V-shaped cross-section on said carrier and an opposing cam-shaped portion of said control shaft, said biasing means bias said shoulders of said carrier against said opposing cam-shaped shaft portions, and said control shaft is rotatable out of an initial position, in which both shoulders of said carrier rest against said cam-shaped portions of said control shaft and said driving part is displaced from said two friction wheels, into two respective operating positions in which one said shoulder of said carrier if lifted from its respective cam shaped shaft portion and the other shoulder of the carrier rests against its respective shaft portion and said driving part rests against the respective friction wheel of the swivel bearing whose shoulder is resting against its respective shaft portion.

3. In an apparatus according to claim 2, characterized in that said carrier has a U-shaped cross-section and has two leg portions extending perpendicularly to the plane through the axes of said two friction wheels and at least one web portion connecting said two leg portions to one another and extending in the direction of the axes of said two friction wheels, said control shaft being arranged between the said two leg portions of said carrier and adjacent to said web portion of said carrier, and said web portion comprises said two essentially V-shaped shoulders of the carrier.

4. In an apparatus according to claim 3, characterized in that said control shaft additionally has at least one circular disc-shaped shaft portion of larger diameter than the control shaft, and one of said two leg portions of said carrier rests against said disc-shaped shaft portion in the direction of the axes of said two friction wheels for positioning said carrier.

5. In an apparatus according to claim 4, further comprising a displaceable locking means for locking said control shaft against rotation in its initial position.

6. Apparatus according to claim 5, characterized in that the locking device is formed by a displaceable braking part for the two friction wheels, which braking part has two braking surfaces for braking the two friction wheels, with which the control shaft can be locked against rotation when the braking surfaces have been lifted off from the friction wheels and which releases the control shaft for rotation when the braking surfaces have been placed against the friction wheels.

* * * * *